US010657188B2

(12) United States Patent
Baldwin et al.

(10) Patent No.: US 10,657,188 B2
(45) Date of Patent: May 19, 2020

(54) REPRESENTATIONAL STATE TRANSFER RESOURCE COLLECTION MANAGEMENT

(71) Applicant: INTERNATIONAL BUSINESS MACHINES CORPORATION, Armonk, NY (US)

(72) Inventors: Timothy J. Baldwin, Hursley (GB); Thomas A. Evans, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 14/860,864

(22) Filed: Sep. 22, 2015

(65) Prior Publication Data

US 2016/0085862 A1 Mar. 24, 2016

(30) Foreign Application Priority Data

Sep. 23, 2014 (GB) .................................. 1416786.0

(51) Int. Cl.
  *G06F 17/30* (2006.01)
  *G06F 16/951* (2019.01)
  *G06F 16/955* (2019.01)

(52) U.S. Cl.
  CPC .......... *G06F 16/951* (2019.01); *G06F 16/955* (2019.01)

(58) Field of Classification Search
  CPC ......... G06F 17/30864; G06F 17/30876; G06F 16/955; G06F 16/951
  USPC .......... 707/769, E17.011, E17.013, E17.014, 707/E17.095, E17.111, 688, 706, 740
  See application file for complete search history.

(56) References Cited

U.S. PATENT DOCUMENTS

| 6,038,603 A * | 3/2000 | Joseph ................... H04L 29/06 370/465 |
| 6,901,431 B1 * | 5/2005 | Dodrill ................... H04L 29/06 379/88.17 |
| 8,275,888 B2 | 9/2012 | Branigan et al. |
| 8,447,829 B1 * | 5/2013 | Geller ..................... G06F 9/468 709/217 |
| 2006/0235837 A1 * | 10/2006 | Chong .............. G06F 17/30448 |
| 2007/0094288 A1 * | 4/2007 | Enenkiel ........... G06F 17/30864 |
| 2008/0104032 A1 * | 5/2008 | Sarkar ................. G06F 17/3089 |
| 2008/0201338 A1 * | 8/2008 | Castro ............... G06F 17/30604 |
| 2008/0294978 A1 | 11/2008 | Klintsov et al. |
| 2008/0306928 A1 * | 12/2008 | Brunner ........... G06F 17/30997 |
| 2009/0106234 A1 * | 4/2009 | Siedlecki ........... G06Q 30/0276 |
| 2010/0094819 A1 * | 4/2010 | Bornhoevd ....... G06F 17/30445 707/705 |

(Continued)

OTHER PUBLICATIONS

IBM, "A System and Method for Efficient RDF Query Processing," IP.com No. IPCOM000180721D, Mar. 16, 2009, pp. 1-6.

*Primary Examiner* — Shiow-Jy Fan

(74) *Attorney, Agent, or Firm* — Alexander G Jochym, Esq.; Wayne F. Reinke, Esq.; Heslin Rothenberg Farley & Mesiti P.C.

(57) ABSTRACT

Management of resources within a representational state transfer architecture comprising a plurality of service resources. A persisted collection resource is accessed, and the persisted collection resource includes a collection query with at least one query parameter defining a collection of resources. The collection query is processed with respect to the resources within the computer system to generate a list of resources associated with the at least one query parameter.

10 Claims, 8 Drawing Sheets

(56) References Cited

U.S. PATENT DOCUMENTS

| | | | |
|---|---|---|---|
| 2010/0106729 A1* | 4/2010 | Pan | G06F 16/951 707/747 |
| 2011/0078166 A1* | 3/2011 | Oliver | G06F 17/30864 707/760 |
| 2011/0125904 A1* | 5/2011 | Branigan | G06F 17/30911 709/226 |
| 2011/0289520 A1* | 11/2011 | Grigoriev | G06F 17/3089 719/331 |
| 2012/0047130 A1* | 2/2012 | Perez | G06F 8/34 707/723 |
| 2012/0047483 A1* | 2/2012 | Amit | G06F 17/30861 717/104 |
| 2013/0159530 A1* | 6/2013 | James | G06F 16/9566 709/226 |
| 2013/0246454 A1 | 9/2013 | Menten | |
| 2014/0214857 A1* | 7/2014 | Srinivasan | G06F 16/80 707/748 |

* cited by examiner

REPRESENTATIONAL STATE TRANSFER RESOURCE COLLECTION MANAGEMENT

PRIOR FOREIGN APPLICATION

This application claims priority from United Kingdom (GB) patent application number 1416786.0, filed Sep. 23, 2014, which is hereby incorporated herein by reference in its entirety.

BACKGROUND

One or more aspects of the present invention relate to managing representational state transfer architecture resource collections within a computer system.

Networked computer systems offering a multitude of services to users are commonplace. Indeed, society is shifting towards an electronic way of life, in which many daily tasks are performed over such networks. For example, social interaction and commerce are performed over networks implementing services or applications (apps). Developers can create services or apps using an application programming interface (API) developed and supported by the service provider. The API for a service provider may implement a Representational State Transfer (REST) architecture that consists of clients and servers. Clients initiate requests to servers, which process requests and return appropriate responses to the clients. Requests and responses are built around the transfer of representations of resources. A resource can be virtually any coherent and meaningful concept that may be addressed. A representation of a resource is typically a document that captures the current or intended state of a resource. Generally, a RESTful architecture, i.e. an architecture which complies with the REST style, must be client-server based, stateless, cacheable, layered, use a uniform interface, and may provide code on demand. Similarly a RESTful resource is a resource which may be implemented or employed within a RESTful architecture, and a RESTful API is an API for a service implemented within a RESTful architecture.

The fundamental concept in any RESTful API is the resource. A resource is an object with a type, associated data, relationships to other resources, and a set of methods that operate on it. It is similar to an object instance in an object-oriented programming language, with one difference being that only a few standard methods are defined for the resource (corresponding to the standard HTTP GET, POST, PUT and DELETE methods), while an object instance typically has many methods. Therefore, a typical API may include a defined set of Hypertext Transfer Protocol (HTTP) request messages along with a definition of the structure of response messages. The definition of the structure of the response messages may for example be in an Extensible Markup Language (XML) or JavaScript Object Notation (JSON) format.

Resources may be grouped into collections. Each collection should be homogeneous in that each collection should contain only one type of resource, and may typically be unordered. Collections are themselves resources. Collections may exist globally, at the top level of an API, but may also be contained inside a single resource. In the latter case, we refer to these collections as sub-collections. Sub-collections are usually used to express some kind of "contained in" relationship.

With the focus on API and Service Management in the Cloud, the management of RESTful resources and resource collections is increasingly important. Traditionally, there are two ways to serve up a collection of RESTful resources both of which are problematic especially with regards to evolving and changing resource and resource collections.

A first management approach has been to define a collection as an entirely 'virtual' resource. The contents of the collection are inferred by the server from the path segments of the requested Uniform Resource Identifier (URI). As 'virtual' collection resources tend to rely on the structure of the Resource URIs being completely fixed, changing the URI structure or adding additional collections is made very difficult.

A second management approach has been to define a 'persisted' collection resource. In such an approach, the 'persisted' collection may contain a list of references to the resources in the collection. When a new resource is added or removed, then the list in the collection resource must be updated at the same time.

SUMMARY

In accordance with an aspect of the present invention, a computer-implemented method of managing resources within a computer system implementing a representational state transfer architecture is provided. The computer-implemented method includes accessing a persisted collection resource, the persisted collection resource comprising a collection query with at least one query parameter defining a collection of resources; and processing the collection query with respect to resources within the computer system to dynamically generate a list of resources associated with the at least one query parameter.

In accordance with another aspect of the present invention, a system for managing resources within a computer system implementing a representational state transfer architecture is provided. The system includes a memory; and a processor in communication with the memory, wherein the system is configured to perform a method. The method includes accessing a persisted collection resource, the persisted collection resource comprising a collection query with at least one query parameter defining a collection of resources; and processing the collection query with respect to resources within the computer system to dynamically generate a list of resources associated with the at least one query parameter.

In accordance with yet another aspect of the present invention, a computer program product for managing resources within a computer system implementing a representational state transfer architecture is provided. The computer program product includes a computer readable storage medium readable by a processing circuit and storing instructions for execution by the processing circuit for performing a method. The method includes accessing a persisted collection resource, the persisted collection resource comprising a collection query with at least one query parameter defining a collection of resources; and processing the collection query with respect to resources within the computer system to dynamically generate a list of resources associated with the at least one query parameter.

DESCRIPTION OF THE DRAWINGS

Embodiments of the present invention will now be described, by way of example only, with reference to the following drawings, in which.

DETAILED DESCRIPTION

Figure 1:
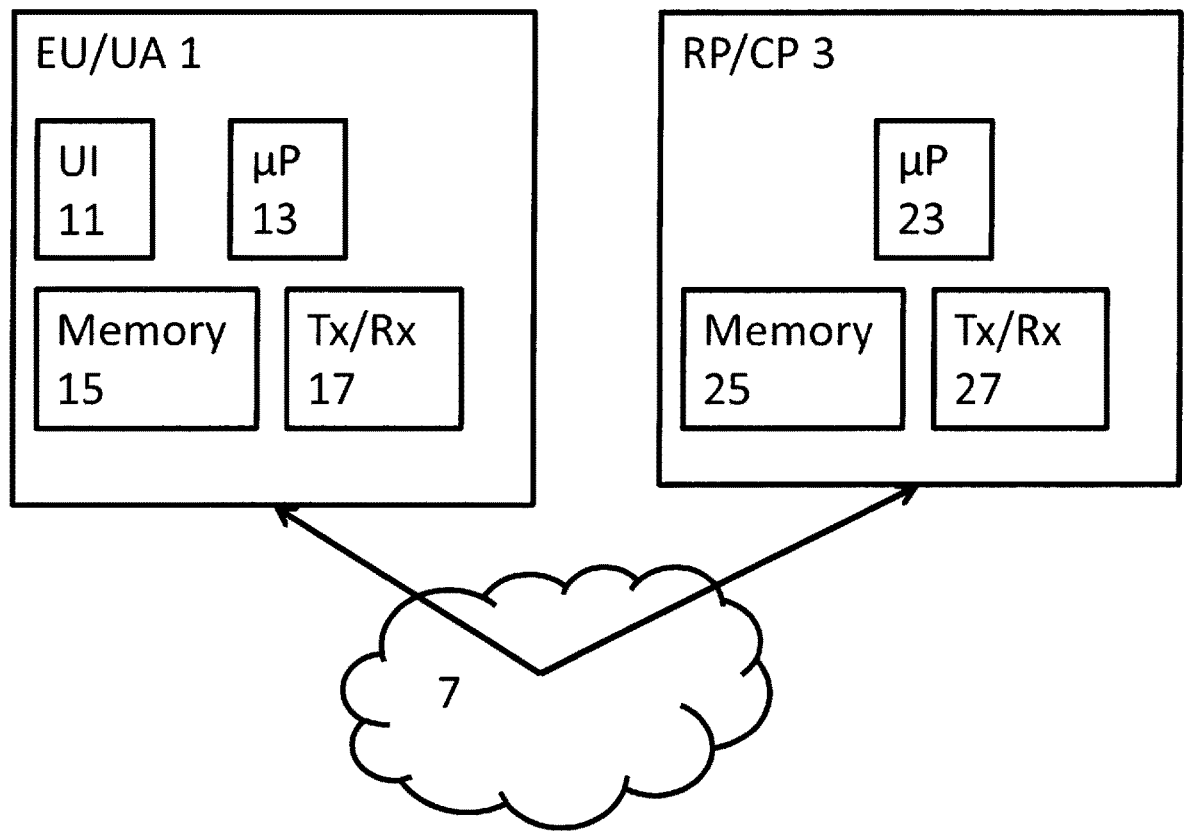
FIG. 1 schematically depicts one example of a computer system according to some embodiments.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The various embodiments of the method of aspects of the present invention may be stored as computer-executable program code on a computer program product comprising a computer-readable storage medium. The computer-readable storage medium may be any medium that can be accessed by a computer for the retrieval of digital data from said medium. Non-limiting examples of a computer-readable storage medium include a CD, DVD, flash memory card, a USB memory stick, a random access memory, a read-only memory, a computer hard disk, a storage area network, a network server, an Internet server and so on.

In the context of the present application, a (computer) system may be a single device or a collection of distributed devices that are adapted to execute one or more embodiments of the methods of aspects of the present invention. For instance, a system may be a personal computer (PC), a server or a collection of PCs and/or servers connected via a network such as a local area network, the Internet and so on to cooperatively execute at least one embodiment of the methods of aspects of the present invention.

One concept, as expressed herein, is the provision, management and accessing of a collection resource which may be persisted. The persisted collection resource may, as described herein, comprise a query or set of query parameters. When the query is processed or executed, it results in a list of resources defining the collection being generated. The embodiments applying such approaches are advantageous in that the identifier (URI) of the collection does not need to conform to any predefined pattern. Furthermore, such embodiments when implemented reduces processing load in that the collection does not need to be updated when members are added or removed. Such embodiments may further solve a problem in enabling new collections to be easily added at any time. Additionally, all resources, including collections, may be persisted as actual resources in the datastore.

FIG. 1 schematically depicts an example computer system according to some embodiments. The computer system in some embodiments may comprise an end user/user (EU/UA) apparatus 1, which hereinafter is referred to as the user apparatus. The user apparatus 1 may be in some embodiments configured to be operated by an end user and may be further configured to access resources or services provided by the resource provider/collection provider (RP/CP) apparatus 3 via a network 7. The resource provider/collection provider (RP/CP) apparatus 3 may be referred hereinafter as the resource provider apparatus 3. The user apparatus 1 and the resource provider apparatus may be physically separate computing apparatus, such as described and shown herein, or may be integrated within a single computing apparatus or co-located computer apparatus or processors.

The user apparatus 1 may in some embodiments comprise at least one microprocessor (μP) 13. The microprocessor 13 may be any suitable processing means or apparatus and may be configured to fetch and execute computer executable program code. The computer executable program code may, for example, be stored on a memory 15 which is a computer readable storage medium of any suitable form. The computer readable storage medium may for example include a CD, DVD, flash memory card, a USB memory stick, a random access memory, a read only memory, a computer hard disk, a storage area network, a network server, an internet server and so on.

Furthermore, in some embodiments, the user apparatus 1 may comprise a user interface (UI) 11 configured to enable the user or end user to interact with the user apparatus 1. The user interface 11 may, for example, comprise any suitable input apparatus or means such as: a keyboard, a mouse, a touch screen input, a digital key reader, a digital token reader. Furthermore, the user interface 11 may comprise any suitable output apparatus or means such as: a display of any suitable format such as LED, OLED, LCD or printed display, a speaker or headset suitable for providing an audio output or a tactile output, such as a vibra for providing touch based output.

The user apparatus 1 may further comprise a transceiver (Tx/Rx) 17 suitable for communicating via the network 7 to a suitable resource provider apparatus 3.

The computer system may further comprise a resource provider/collection provider (RP/CP) apparatus 3. The resource provider 3 may, in some embodiments, comprise at least one microprocessor (μP) 23. The microprocessor 23 may be any suitable processing means or apparatus and may be configured to fetch and execute computer executable program code. The computer executable program code may for example be stored on a memory 25 which is a computer readable storage medium of any suitable form. The computer readable storage medium may for example include a CD, DVD, flash memory card, a USB memory stick, a random access memory, a read only memory, a computer hard disk, a storage area network, a network server, an internet server and so on.

The resource provider 3 may further comprise a transceiver (Tx/Rx) 27 suitable for communicating via the network 7 to a suitable user apparatus 1.

The resource provider apparatus 3 may, in some embodiments, be configured to store and/or access services and/or resources. The resource provider apparatus 3 may store and provide access to the resources according to a REST architecture scheme. For example, the memory 25 may store the resources which are accessed according to embodiments as described herein. In other words, the resource provider apparatus may store the resources locally.

The resource provider apparatus 3 may further be configured to access the resources from a further apparatus, such as a resource storage or server apparatus. In other words, the resources are stored remotely from the resource provider apparatus. Where the resources are stored remotely, the resource provider 3 may communicate with the remote store to access the resources according to the embodiments described herein.

Figure 2A:
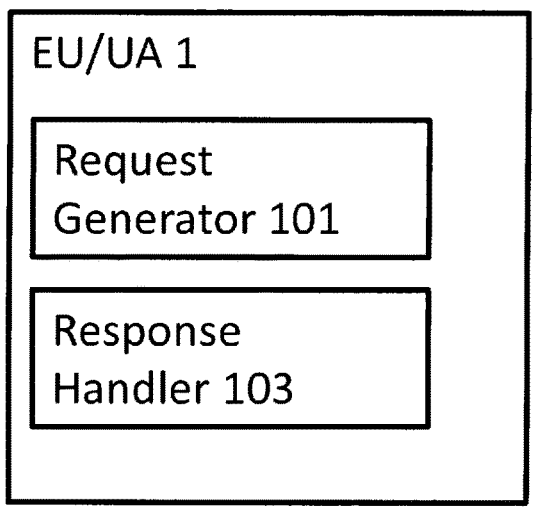
FIGS. 2a and 2b schematically depict elements within the computer system shown in FIG. 1 according to some embodiments.

With respect to FIG. 2a, a schematic view of the user apparatus 1 is further shown with respect to operational modules suitable for implementing resource management according to some embodiments. The following operational modules as shown herein with respect to the user apparatus 1 may represent computer code, programs or parts of computer code or programs stored within the memory 15 and implemented or executed within the microprocessor 13, as shown in FIG. 1. At least one of the operational modules may furthermore be implemented as separate hardware, or firmware components within the user apparatus 1. The user apparatus 1 may in some embodiments comprise a request generator 101. The request generator 101 may be configured to receive requests from the user interface to retrieve or interact with services and/or resources from a remote server such as the resource provider apparatus 3. The request generator 101 may thus be configured to generate messages or collection requests which can be passed over the network 7 in order to interact with these services and/or resources. The request generator 101 may for example generate a request comprising a uniform resource identifier (URI), a string of characters used to identify a name of a resource. The request generator 101 may furthermore generate a RESTful request in the form of an action or method. For example, an HTTP action or method request may be a GET, PUT, POST or DELETE method request.

Furthermore, the user apparatus 1 may further be configured to receive any responses or returns from the resource provider apparatus 3. The user apparatus may, for example, comprise a response handler 103 configured to receive a response or return message from the resource provider apparatus 3 based on the processing of the request at the resource provider apparatus 3. For example, a response or return message with respect to a REST GET action or operation such as http://myhost/rest/services may be a collection resource identified by the URI location and following the resource management methods and processes as described herein with respect to embodiments of the invention.

Figure 2B:
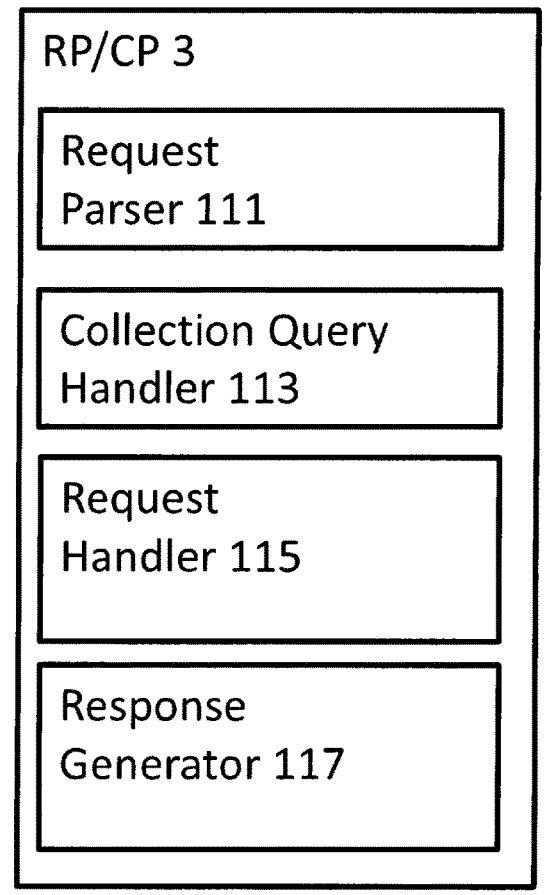

With respect to FIG. 2b, the resource provider apparatus 3 is further shown with respect to operational modules suitable for implementing distributed authentication according to some embodiments. The operational modules as shown herein with respect to the resource provider apparatus 3 may represent computer code, programs or parts of computer code or programs stored within the memory 25 and implemented or executed within the microprocessor 23 as shown in FIG. 1. At least one of the operational modules may furthermore be implemented as separate hardware, or firmware components within the resource provider apparatus 1. In some embodiments, the resource provider apparatus 3 comprises a request parser 111. The request parser 111 may be configured to receive requests for services and/or resources from the user apparatus and furthermore parse the request in order to determine an identifier (such as a URI) configured to identify the location of a persisted collection resource.

The resource provider apparatus 3 may further comprise a collection query handler 113. The collection query handler 113 may be configured to receive the identifier from the request parser 111. Furthermore, using the identifier, the collection query handler 113 may be configured to access the location of the persisted collection resource and determine the persisted collection resource comprises a collection query with at least one query parameter associated with a defined collection of resources. In other words, the identifier may define a location of a persisted collection resource which rather than containing a list of resources comprises a query comprising at least one parameter which when processed or executed results in the list of resources in the collection.

The resource provider apparatus 3 may comprise a collection query handler 113. The collection query handler 113 may then execute the query and the at least one query parameter.

The query may be any suitable database query to be run or executed with regards to any suitable database or database data type. For example, the query may be a SPARQL query to be run over N-TRIPLE data. The results of the query can, for example, return or generate a list of the real members of the collection resource. In such a manner, the collection may be dynamically generated by the execution of the collection resource inquiry.

A further suitable example would be one where the data may be stored in a more traditional relational database. In such embodiments the suitable database query to be run or executed with regards to the relational database data would be an SQL query.

The dynamic generation of the collection list of the real members of the collection resource therefore results in a persisted collection resource which does not need to be updated when a member of the collection is added or removed.

Furthermore, because there is a resource persisted at the collection URI or identifier, the server or resource provider does not need any special knowledge of URI structure. The server or resource provider is only required to know the collection resource type.

A RESTful system implementing such embodiments may for example allow a user to create new collections at any time. For example, by using an HTTP action or method, such as an HTTP POST or HTTP PUT, a new persisted collection resource may be generated. This can be implemented, for example, by including a new collection query or query parameters within the POST method such that a following HTTP GET action or method to the same identifier URI may cause the resource provider to access the collection query. The accessed collection query may then be executed to dynamically generate the list of resources associated with the collection query parameters and therefore the defined collection.

Furthermore, using an HTTP action or method may enable the collection to be defined at any location, and not for example limited to a defined group or set of collection identities, and may contain any sub-set of resources.

The dynamic generation of collection lists therefore permits the shifting of the processing, loading of the computer from the creation of the collection operations to the accessing of the collection.

In such computer systems employing embodiments as described herein this contribution may improve the performance of the computer system where the computer system performs many more collection generation operations than access operations such as would be experienced in a dynamic or evolving computer system.

A similar point may be made with respect to the amendment or maintenance of any collection. In order to amend or modify a collection, a user need not know the URI structure implemented at the data storage apparatus, such as the resource provider. Only the data structure of the resources is required to be known in order to generate the desired query.

Thus, a collection may be modified simply by amending or modifying a persisted collection query associated with an identifier (URI). A new collection list may then be generated when the identifier (URI) location is accessed by the accessing and processing of the identified location collection query.

Furthermore, the dynamic generation of collection lists by the use of the collection query during accessing means that the addition or removal of resources does not require a collection maintenance operation to be executed to determine whether the action of adding or removing a resource causes a change in any of the collection lists. Thus, in computer systems where data is added more frequently than is accessed, the contribution as defined in embodiments herein enables the computer to operate more effectively.

The dynamic generation of collection lists by the use of the collection query during accessing furthermore allows the user to have a greater certainty that the collection list information is correct and current. In other words, the computer system is a more reliable system and produces fewer errors and error outputs.

This is because in such systems the accessing and the processing or executing of the query within the persisted collection resource would return a new list of the resources associated with the collection each time the request is made rather than a previously generated or cached list which may contain obsolete resources or missing resources which have not yet been added to the collection list.

Furthermore, such embodiments as described herein may have a storage benefit. The memory or storage requirements for such a system as described herein where the average size of a persisted collection query is less than the average size of the persisted list of resources.

The resource provider apparatus 3 may further comprise a request handler 115. The request handler 115 may be configured to receive the results of the query performed on the data, for example the list of real members of the collection resource. The request handler 115 may then further perform the request action or operation as defined in the service request with respect to the collection of resources. For example, a GET action or operation request may return the identified collection or resources.

In some embodiments, the resource provider apparatus 3 may further comprise a response generator 117. The response generator 117 may be configured to generate a suitable response or return message for the user apparatus 1 based on the output of the request handler 115. For example, the response generator in response to the output of the service request handler executing the GET action or operation request to return the identified collection or resources list of real members of the collection resource may be to generate a suitable message to be transmitted to the user apparatus comprising the identified collection or resources identified by the list of the real members of the collection resource.

Figure 3:
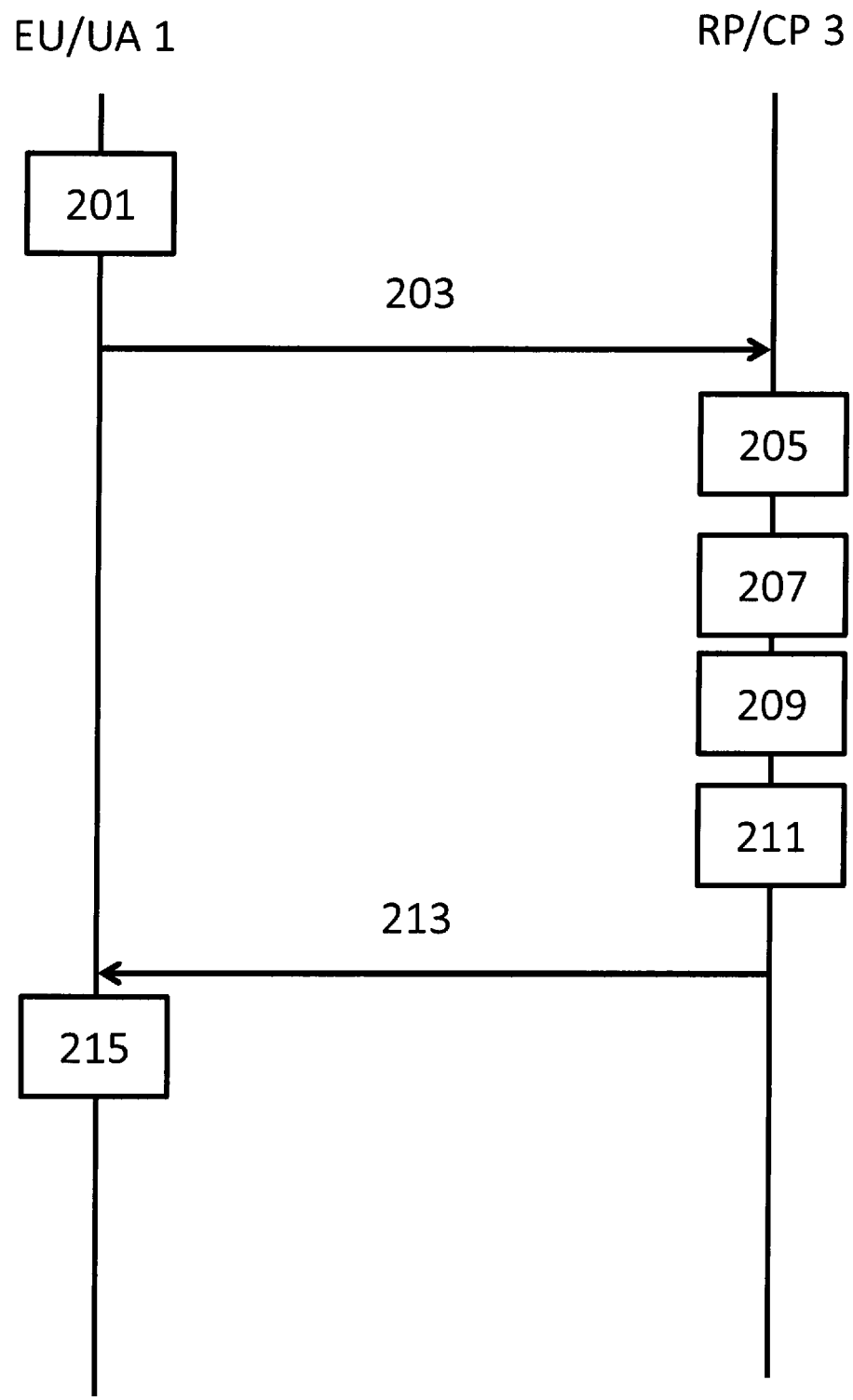
FIG. 3 schematically depicts an aspect of a method according to some embodiments.

With respect to FIG. 3, an example flow diagram shows the operations of a system employing resource collection management according to some embodiments. In this example, the user apparatus is configured to generate a REST GET request against the URI http://myhost/rest/services. This operation may be performed by the request generator 101.

The operation of generating a request message is shown in FIG. 3 by step 201.

The request message may then be transmitted from the user apparatus 1 to the resource provider 3.

The operation of transmitting the request message is shown in FIG. 3 by step 203.

The resource provider apparatus 3 may be configured to receive the request and parse the message to determine the location identified by the identifier, such as the URI. This may be performed by the request parser 111.

The operation of determining the location identified from the identifier within the request message is shown in FIG. 3 by step 205.

The resource provider apparatus 3 may furthermore be configured to determine that the identified location comprises a collection query comprising at least one query parameter. An example of which may be:

<http://myhost/rest/services> <http://www.abc.org/1999/02/22-rdf-syntax-ns#type> <http://www.xyz.com/ns/rest#Collection> .
<http://myhost/rest/services> <http://www.xyz.com/ns/rest#query> "WHERE { ?x <http://www.abc.org/1999/02/22-rdf-syntax-ns#type> <http://www.xyz.com/ns/rest#Service> }" .

In this example, the data is an N-TRIPLE data form and the value of query is a SPARQL 'WHERE' clause that could be used in a SPARQL query over the data.

The resource provider apparatus 3 may furthermore be configured to execute the collection query associated with a defined collection with respect to the data to determine a list of resources associated with the collection. This may be performed by the collection query handler 113.

The operations of determining that the identified location comprises a collection query and the execution of the collection query with respect to data to generate a list of resources associated with the collection is shown in FIG. 3 by step 207.

The resource provider apparatus 3 may furthermore be configured to process the request based on the list of resources determined by the execution of the collection query. This may be performed by the request handler 115.

Thus, using the above REST GET service request message example, the processing of the request can be generating a fully populated collection resource to be returned to the user apparatus.

<http://myhost/rest/services> <http://www.abc.org/1999/02/22-rdf-syntax-ns#type> <http://www.xyz.com/ns/rest#Collection> .
<http://myhost/rest/services> <http://www.abc.org/2000/01/rdf-schema#member> <http://myhost/rest/services/service1> .
<http://myhost/rest/services> <http://www.abc.org/2000/01/rdf-schema#member> <http://myhost/rest/services/service2> .
<http://myhost/rest/services> <http://www.abc.org/2000/01/rdf-schema#member> <http://myhost/rest/services/service3> .
<http://myhost/rest/services> <http://www.abc.org/2000/01/rdf- -continued

```
schema#member> <http://myhost/rest/services/service4> .
<http://myhost/rest/services> <http://www.abc.org/2000/01/rdf-
schema#member> <http://myhost/rest/services/service5> .
<http://myhost/rest/services> <http://www.abc.org/2000/01/rdf-
schema#member> <http://myhost/rest/services/service6> .
```

The operation of processing the request is shown in FIG. 3 by step 209.

The resource provider apparatus 3 may furthermore be configured to generate a response or return. This may be performed by the response generator 117.

The operation of generating the response message is shown in FIG. 3 by step 211.

The resource provider apparatus 3 may furthermore transmit the service response or return message to the user apparatus 1.

The operation of transmitting the service response or return message is shown in FIG. 3 by step 213.

The user apparatus 1 may furthermore receive the service response and process the service response using any suitable method. This may be performed by the response handler 103.

The operation of processing the service response is shown in FIG. 3 by step 215.

Figure 4:
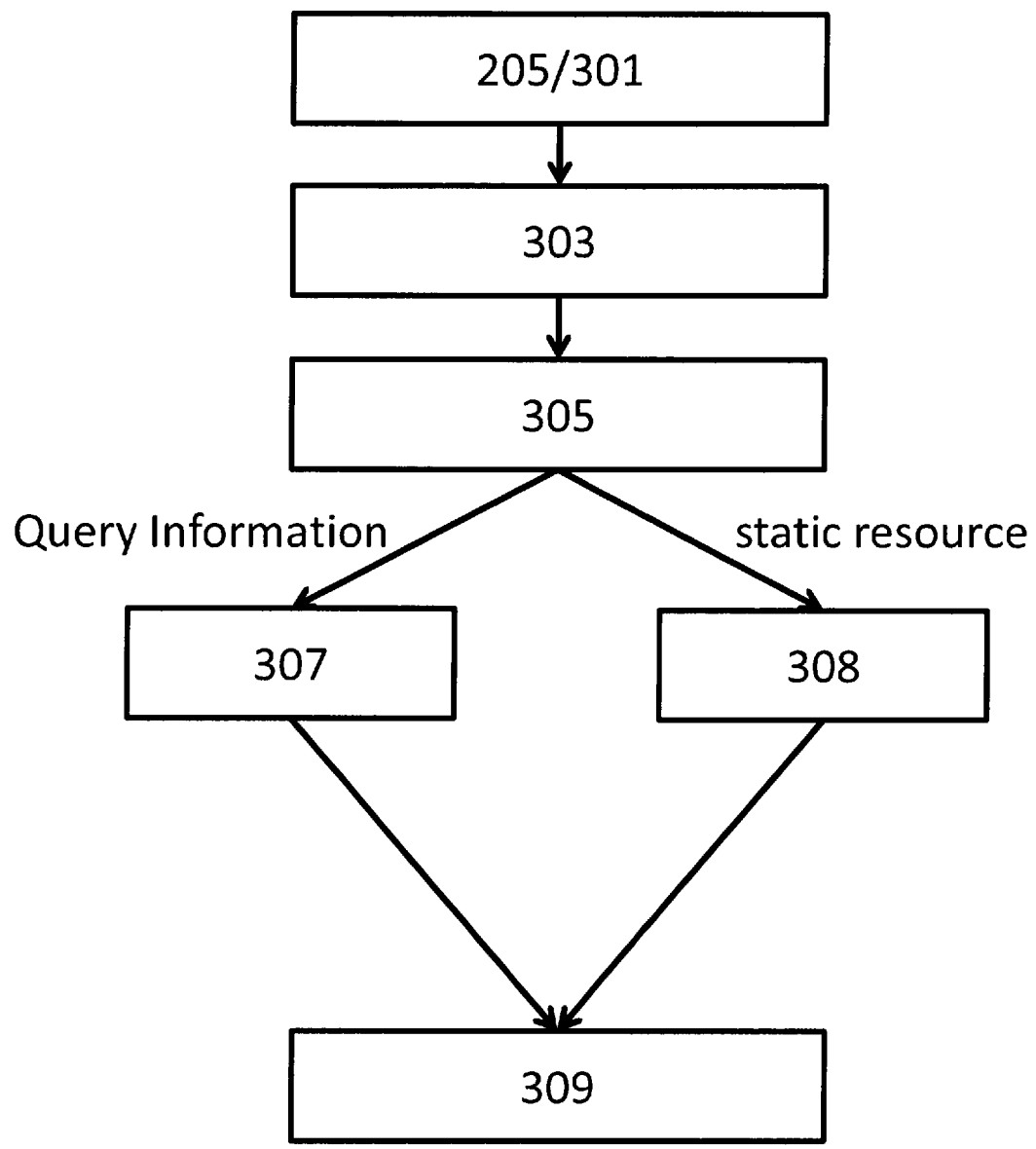
FIG. 4 schematically depicts a method of handling requests within the resource provider for co-located static Resources and dynamic Collection Resources in a single persisted data-set in further detail according to some embodiments.

With respect to FIG. 4, a further example flow diagram shows a method of handling requests within the resource provider for co-located static Resources and dynamic Collection Resources in a single persisted data-set in further detail.

In other words, FIG. 4 shows the operations of a resource provider following the receipt of a request and focussing on the handling of the request where the resources include both conventional static resources and dynamic collection resources as discussed herein. In this example, the request being handled is similar to the example as discussed above, a REST GET request against the URI http://myhost/rest/CollectionA, which comprises a dynamic collection resource query such as described herein or a REST GET request against URI http://myhost/rest/CollectionA/resource1, which comprises a static resource.

The resource provider apparatus 3 may be configured to receive the request and parse the message to determine the location identified by the identifier such as the URI. This may be performed by the request parser 111.

The operation of determining the location identified from the identifier within the request message is shown in FIG. 4 by step 205/301. This is similar to the operation shown as step 205 in FIG. 3 where the request is linked with or associated with a request dynamic collection resource.

The resource provider apparatus 3 may furthermore be configured to examine or retrieve data from the identified location or resource location.

The operation of examining or retrieving data from the identified location or resource location is shown in FIG. 4 by step 303.

The resource provider apparatus 3 may furthermore be configured to determine whether the data from the identified location or resource location is a static resource or a collection dynamic resource comprising query information.

The operation of determining whether the data from the identified location is either a static resource or a dynamic resource comprising query information is shown in FIG. 4 by step 305.

Where the data is a dynamic resource comprising query information, the query may be executed on the database. For example, a SPARQL WHERE query or a SQL SELECT . . . FROM . . . WHERE query to determine a list of resources. For example, a request for the URI http://myhost/rest/CollectionA which may have the SPARQL query is as follows:

```
<http://myhost/rest/CollectionA>
    <http://www.abc.org/1999/02/22-rdf-
    syntax-ns#type> <http://www.xyz.com/ns/rest#Collection> .
<http://myhost/rest/CollectionA>
    <http://www.xyz.com/ns/rest#query>
        "WHERE { ?x
            <http://www.abc.org/1999/02/22-rdf-syntax-ns#type>
<http://www.xyz.com/ns/rest#CollectionA> }" .
```

In this example, the data is an N-TRIPLE data form and the value of query is a SPARQL 'WHERE' clause that could be used in a SPARQL query over the data.

The result of executing such operation can output results of the query.

The operation of executing a query from a dynamic resource is shown in FIG. 4 by the branched step 307.

Where the data is a static resource, then the static resource information can be output.

The operation of retrieving and outputting a static resource or the static resource information can be shown in FIG. 4 by the branched step 308.

The resource provider apparatus 3 may furthermore be configured to execute or process the request based on the resource (from the static resource) or list of resources (determined by the handling of the collection query).

Thus, using the example REST GET service request message, the processing of the request can result in a collection resource (such as from the static resource). For example, the REST GET service request against the URI http://myhost/rest/CollectionA/resource1 may return the resource data for resource1. Whereas the REST GET service request may return the collection data for all of the resources identified within the fully populated collection resource list to the requester (such as for example the user apparatus).

The operation of processing the request is shown in FIG. 4 for the co-located static resources and the dynamic collection resources by step 309.

Figure 5:
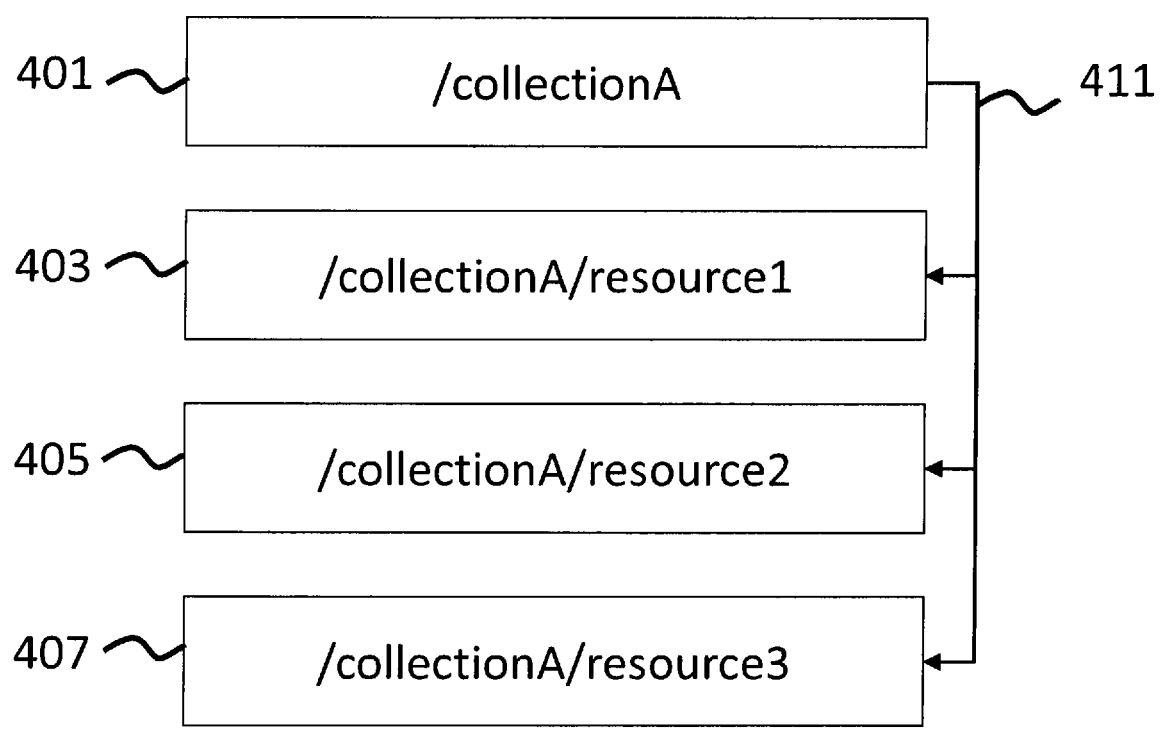
FIG. 5 schematically depicts a resource structure for co-located static Resources and dynamic Collection Resources in a single persisted data-set according to some embodiments.

With respect to FIG. 5 a resource structure for co-located static Resources and dynamic Collection Resources in a single persisted data-set is shown according to some embodiments.

In this example resource structure there are shown three static resources. These are shown as /collectionA/resource1 403, /collectionA/resource2 405 and /collectionA/resource3 407. Although three static resources are shown in this example, it would be understood that there may be more than or fewer than three resources. Furthermore, co-located with the static resources is a dynamic collection resource shown in a single persisted data-set as /collectionA 401. The co-located dynamic collection resource shown herein as described herein and shown by arrow 411 comprises query metadata which may be used to determine the contents of the collection which in this example are the contents of the three static resources /collectionA/resource1 403, /collectionA/resource2 405 and /collectionA/resource3 407.

Figure 6:
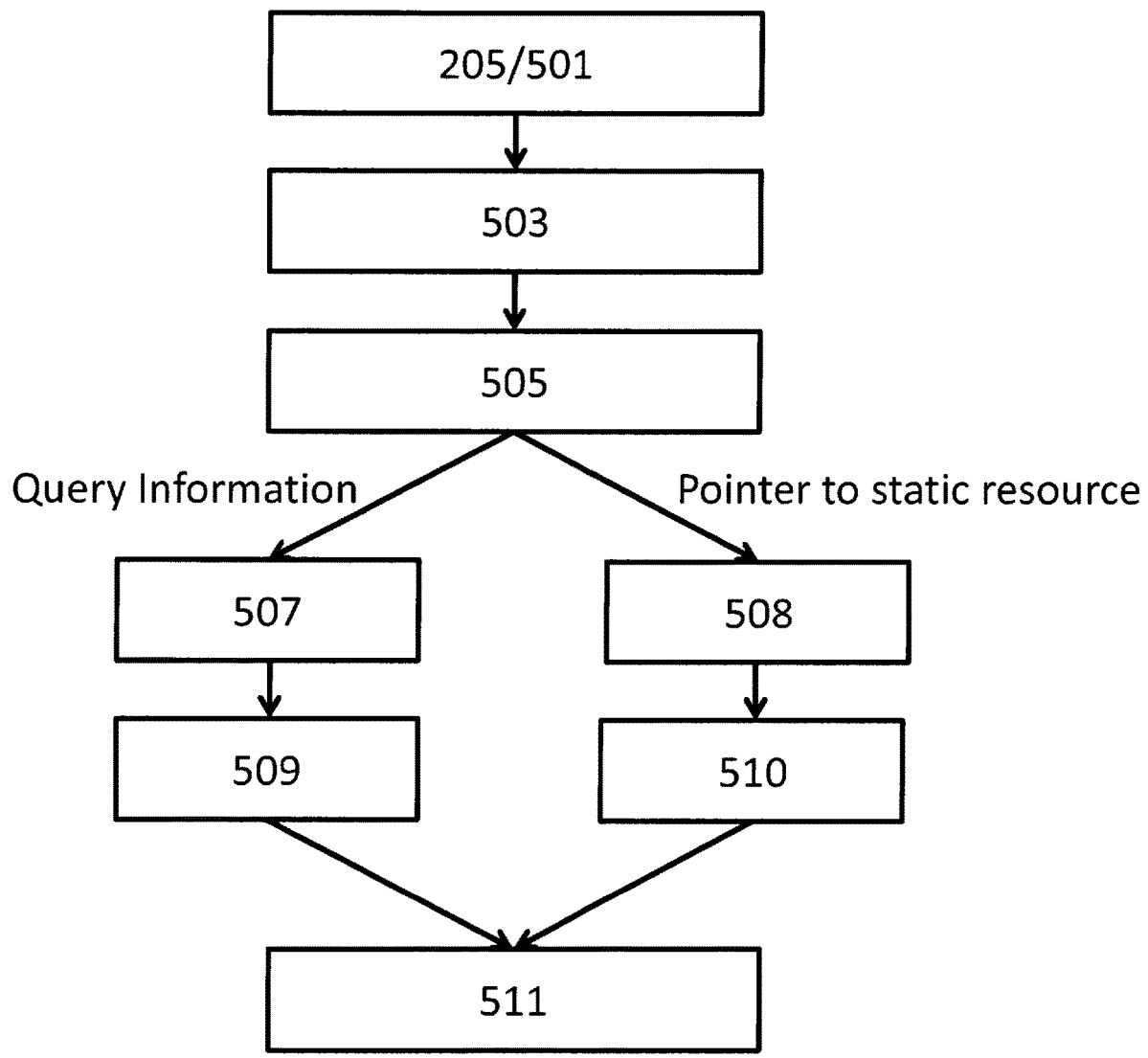
FIG. 6 schematically depicts a method of handling requests within the resource provider for separate static Resources and structural metadata in further detail according to some embodiments.
Figure 7:
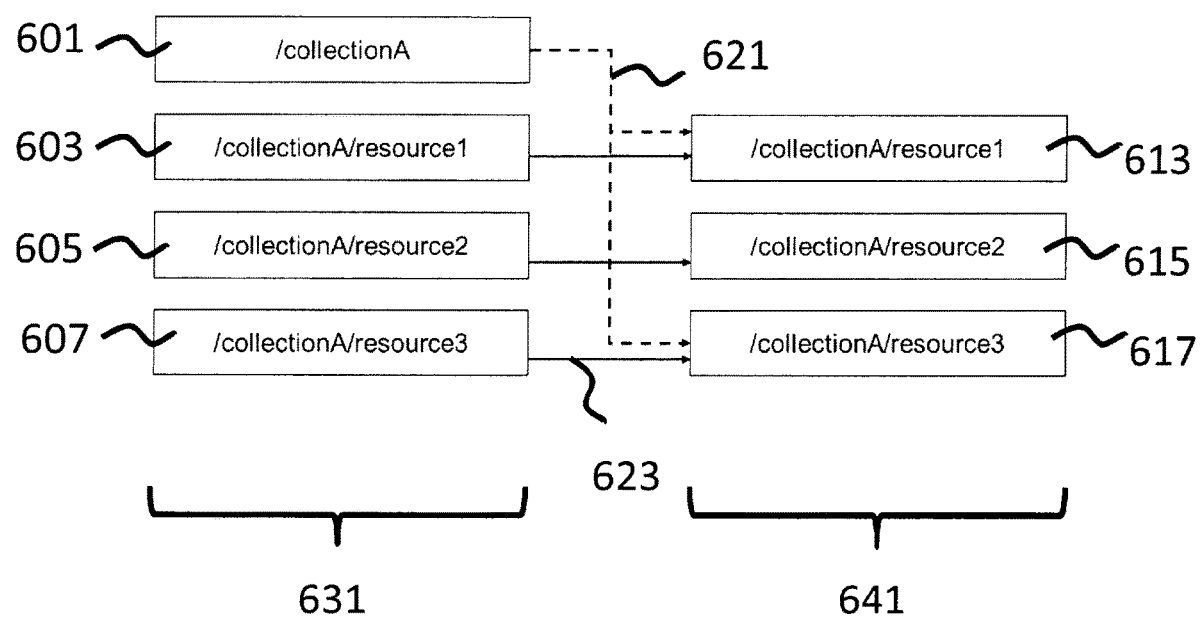
FIG. 7 schematically depicts a resource structure for separate static Resources and structural metadata according to some embodiments.
Figure 8:
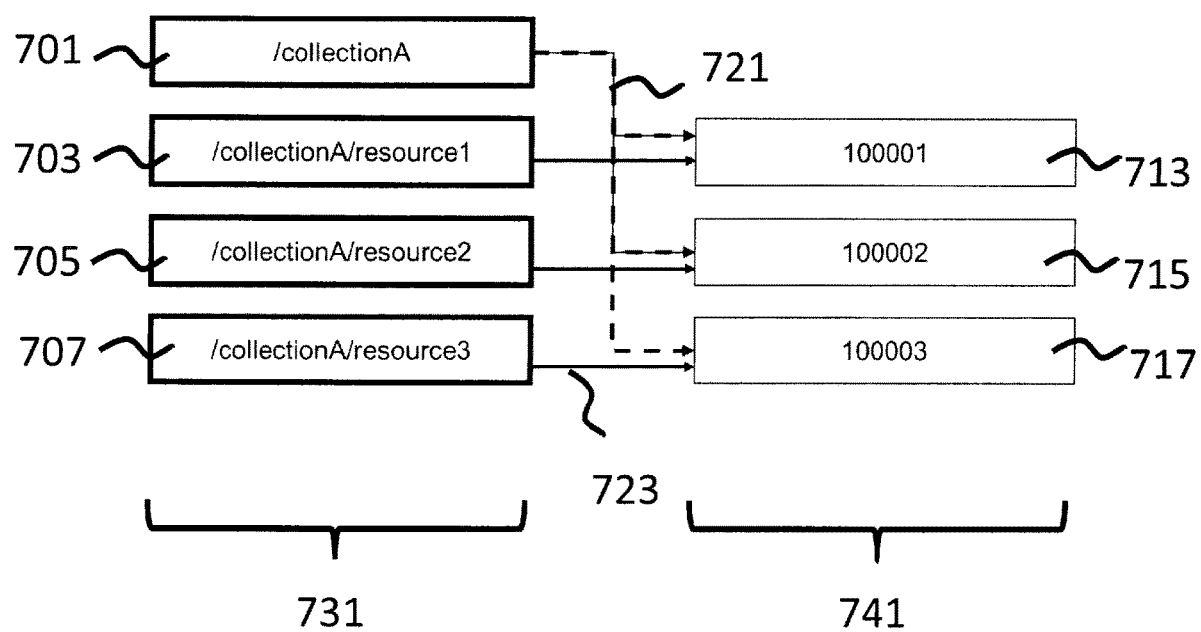
FIG. 8 schematically depicts a further resource structure for separate static Resources and structural metadata according to some embodiments.

With respect to FIGS. 6 to 8 further embodiments or implementations are described with respect to a data structure where the static resources are separated from the structural metadata. In such embodiments, the static resources are completely separated from the dynamic collection resources. This may be implemented by introducing metadata resources located at the URI locations. The metadata resource may then either point to a single static resource or may contain the query information required to resolve a collection of resources.

A further extension or set of embodiments from the implementation described herein is furthermore that each metadata resource located at the URI location comprises query information. The query information when executed on the static resources may be configured to identify a collection comprising a single resource and thus pointing to a single static resource or may identify a collection comprising more than one resource and thus pointing to a collection of resources.

With respect to FIG. 6 an example flow diagram shows a method of handling requests within the resource provider for separated static resources and dynamic collection resources in further detail.

In other words, FIG. 6 shows the operations of a resource provider following the receipt of a request and focusing on the handling of the request where the URI locations comprise metadata resources comprising pointers to single static resources (or queries to extract a list of one resource), and query information required to resolve a collection of resources.

In the example shown with respect to FIG. 6, the request being handled is a REST GET request against the URI http://myhost/rest/CollectionA which comprises a metadata resource comprising a query or a REST GET request against URI http://myhost/rest/collectionA/resource1 which comprises a metadata resource comprising a pointer to a static resource.

The resource provider apparatus 3 may be configured to receive the request and parse the message to determine the location identified by the identifier such as the URI. This may be performed by the request parser 111.

The operation of determining the location identified from the identifier within the request message is shown in FIG. 6 by step 205/501.

The resource provider apparatus 3 may furthermore be configured to examine or retrieve data from the identified location or resource location.

The operation of examining or retrieving data from the identified location or resource location is shown in FIG. 6 by step 503.

The resource provider apparatus 3 may furthermore be configured to determine whether the data from the identified location or resource location is a metadata resource comprising a pointer to a static resource or a metadata resource comprising query information for resolving a collection of resources.

The operation of determining whether the metadata resource at the identified location is either a pointer to a static resource or query information is shown in FIG. 6 by step 505.

Where the metadata is a dynamic resource comprising query information the resource provider may be configured to execute the query on the database. As described herein, the query may be any suitable query to be executed on the separate static resource data. For example, a request for the URI http://myhost/rest/CollectionA may comprise metadata which may have a SPARQL query.

The resource provider may then identify and access the separate static resources.

The operation of identifying and accessing the separate data structure comprising the separate static resources is shown in FIG. 6 by the branched step 507.

The resource provider may then execute the query from the metadata on the separate static resource data structure.

The operation of executing a query from the metadata is shown in FIG. 6 by the branched step 509.

Where the metadata comprises a pointer to a static resource within a separate data structure, then the resource provider may be configured to identify and access the separate data structure from the metadata resource pointer.

The accessing of the separate static resource data structure pointed to by the metadata resource is shown in FIG. 6 by the branched step 508.

Furthermore, the resource provider may then retrieve the separate static resource information identified by the pointer.

The operation of retrieving the static resource or the static resource information can be shown in FIG. 6 by the branched step 510.

The resource provider apparatus 3 may furthermore be configured to execute or process the request based on the resource (from the static resource) or list of resources (determined by the handling of the query).

Thus, using the example REST GET service request message, the processing of the request can result in a collection resource (such as from the static resource). For example the REST GET service request against the URI http://myhost/rest/CollectionA/resource1 may return the resource data for resource1 as retrieved from the separate data structure. Whereas the REST GET service request may return the collection data for all of the resources identified within the fully populated collection resource list of the separate data structure to the requester (such as for example the user apparatus).

The operation of processing the request is shown in FIG. 6 for the co-located static resources and the dynamic collection resources step 511.

With respect to FIG. 7 a resource data structure for separate static resources and metadata is shown according to some embodiments.

In this example resource structure there are shown three static resources located in a first data structure 641. These are shown as /collectionA/resource1 613, /collectionA/resource2 615 and /collectionA/resource3 617. Although three static resources are shown in this example, it would be understood that there may be more than or fewer than three resources.

Furthermore, the example shows a second data structure 631, separate from the first data structure 641. The second data structure 631 is the one accessible from the URL or URI. Each of the resources in the second data structure 631 comprises, as discussed herein, metadata resources which may either point to a single static resource within the first data structure 641 or may contain query information to access the first data structure 641 in order to resolve a collection of resources.

Thus, for example, the second data structure may comprise a resource at URI /collectionA 601 which comprises metadata containing query information to access the first data structure (shown by dashed arrow 621) to determine the contents of the collection which in this example are the contents of the three static resources /collectionA/resource1 613, /collectionA/resource2 615 and /CollectionA/resource3 617.

Furthermore, the second data structure may comprise a resource at URI /collectionA/resource1 603 which comprises metadata containing a pointer to access the first data structure static resource /collectionA/resource1 613.

The example shown in FIG. 7 further shows a resource at URI /collectionA/resource2 605 which comprises metadata containing a pointer to access the second data structure static resource /collectionA/resource2 615.

Finally, in this example, there is shown a resource at URI /collectionA/resource3 607 which comprises metadata containing a pointer (shown by arrow 623) to access the third data structure static resource /collectionA/resource3 617.

As described herein, in some embodiments, the metadata pointers may be replaced with metadata queries for accessing a collection of one resource.

The separation of the static resources and metadata resources for accessing static resources may furthermore, in some embodiments, enable the indexing and the storing of the data structures to be performed in such a manner that each separate data structure can be optimized separately. For example, in some embodiments, the internal identifier of the static resource may be different to that of the external identifier (the URI).

With respect to FIG. 8, a further resource data structure for separate static resources and metadata is shown where the internal identifier and external identifiers are different.

In this example resource structure, there are shown three static resources located in a first data structure 741. These are shown or identified as '100001' 713, '100002' 715 and '100003' 717. Although three static resources are shown in this example, it would be understood that there may be more than or fewer than three resources. Similarly the choice of the identifier may be any suitable choice.

Furthermore, the example shows a second data structure 731, separate from the first data structure 741. The second data structure 731 is the one accessible from the external identifier (the URL or URI). Each of the resources in the second data structure 731 may comprise, as discussed herein, metadata resources which may either point to a single static resource within the first data structure 741 or may contain query information to access the first data structure 741 in order to resolve a collection of resources.

Thus, for example, the second data structure may comprise a resource at URI /collectionA 701 which comprises metadata containing query information to access the first data structure (shown by dashed arrow 721) to determine the contents of the collection which in this example are the contents of the three static resources '100001' 713, '100002' 715 and '100003' 717.

Furthermore, the second data structure may comprise a resource at URI /collectionA/resource1 703 which comprises metadata containing a pointer to access the first data structure static resource '100001' 713.

The example shown in FIG. 8 further shows a resource at URI /collectionA/resource2 705 which comprises metadata containing a pointer to access the second data structure static resource '100002' 715.

Finally, in this example, there is shown a resource at URI /collectionA/resource3 707 which comprises metadata containing a pointer (shown by arrow 723) to access the third data structure static resource '100003' 717.

As described herein, in some embodiments, the metadata pointers may be replaced with metadata queries for accessing a collection of one resource.

As described herein, one aspect of the present invention seeks to provide a more robust method for management of REST resources and resource collections.

Further, one or more aspects of the present invention seek to provide a computer program product comprising computer-readable program code for implementing the steps of such a method when executed on a computer.

Yet further, one or more aspects of the present invention seek to provide a computer system implementing such a method.

According to an aspect of the present invention, there is provided a method for management of resources within a computer system implementing representational state transfer architecture, the method comprising: accessing a persisted collection resource comprising a collection query with at least one query parameter defining a collection of resources; and processing the collection query with respect to the resources within the computer system to dynamically generate a list of resources associated with the at least one query parameter.

In such embodiments as the collection is dynamically generated by the execution of the collection resource inquiry, the collection resource does not need to be updated when a member is added or removed. Furthermore, because there is a resource persisted at the collection URI, the server or resource provider does not need any special knowledge of URI structure, only knowledge of the collection resource type. This may for example allow a user to create new collections at any time (via POST or PUT of new collection resources), at any location, containing any sub-set of resources. Furthermore, this permits the shifting of the loading of the computer from the creation and maintenance of the collection operations to the accessing of the collection.

In such computer systems employing embodiments as described herein this contribution may improve the performance of the computer system where the computer system performs many more collection generation and modification operations than access operations such as would be experienced in a dynamic or evolving computer system. Furthermore, in such systems this contribution may lead to a more efficient computer system as accessing collections would return a correct or current list of the resources associated with the collection rather than a previously generated list which may contain resources which are no longer associated with the collection or missing resources which have not yet been added to the collection list. Furthermore, there may be a storage benefit where the average size of a persisted collection query is less than the average size of the persisted list of resources.

The at least one query parameter may be a SPARQL 'WHERE' clause and a searchable variable. Processing the collection query may comprise evaluating the at least one query parameter with respect to a resource description framework database to generate the list of resources. Thus, in such embodiments, the collection can be determined or generated based on a RDF (Resource Description Framework) database of resources.

The method may further comprise determining a resource request for at least one of the resources, the resource request may comprise a resource identifier; and wherein accessing a persisted collection resource may comprise accessing the persisted collection resource based on the resource identifier.

In such embodiments, service, collection or resource requests from third parties can be handled such that the end user or user apparatus requesting the service and any designer or programmer of the such an end user or user apparatus need not have special knowledge of the structure of the data within the system in order to be able to access the collection information. This contribution thus may significantly reduce the knowledge load required by the designer of an application programming interface attempting to access and interface with the computer system.

Determining a resource request for at least one of the resources may comprise receiving a URI, the URI comprising the resource identifier.

The resource request may further comprise an action. The method may further comprise processing the resource request action based on the list of the resources.

Processing the resource request action based on the list of resources may comprise performing an HTTP action with respect to the list of resources.

The method may further comprise outputting a message based on the processing the resource request action.

The method may further comprise at least one of: providing a resource structure wherein the persisted collection resource is co-located with the resources defined by the collection resource query with at least one query parameter; and providing a resource structure comprising a first resource structure comprising the persisted collection resource and a second resource structure separate from the first resource structure comprising the resources defined by the collection resource query with the at least one query parameter.

The method may further comprise: generating and transmitting to a resource provider a resource request for at least one of the resources; and receiving from the resource provider the message based on the processing of the resource request.

According to another aspect, there is provided a method for management of resources of resources within a computer system implementing a representational state transfer architecture, the method comprising: generating and transmitting to a resource provider a resource request for at least one of the resources, the resource provider configured to receive the resource request, to access a persisted collection resource comprising a collection query with at least one query parameter defining a collection of resources, to process the collection resource query with respect to the resources within the computer system to generate a list of resources associated with the at least one query parameter, to process the resource request based on the list of resources, and to output a message based on the processing of the resource request; and receiving from the resource provider the message based on the processing of the resource request.

In such embodiments, a user apparatus implementing a suitable application programming interface may generate resource requests which can be handled as described in embodiments herein, and thus, access the current collection resources without special knowledge of the structure of the data within the system. This contribution thus may allow the creation of simpler application programming interfaces attempting to access and interface with the computer system, and furthermore, may permit the output of more accurate collection information.

Generating and transmitting to a resource provider a resource request may comprise generating a GET action request with respect to a persisted collection resource identified by a defined URI, and wherein receiving from the resource provider the message may comprise receiving a list of members of the collection generated dynamically at the resource provider based on the collection resource query.

A computer program product may comprise a computer-readable storage medium having computer-readable program code, when executed on at least one processor of a computer, causing the computer to implement the steps of the method featured herein.

According to yet a further aspect, there is provided a resource provider for managing a plurality of resources within a computer system implementing representational state transfer architecture, the resource provider configured to: access a persisted collection resource comprising a collection query with at least one query parameter defining a collection of resources; and process the collection query with respect to the resources within the computer system to generate a list of resources associated with the at least one query parameter.

The at least one query parameter may be a SPARQL 'WHERE' clause and a searchable variable. The resource provider may comprise a collection query handler configured to process the collection query, the collection query handler may be configured to evaluate the at least one query parameter with respect to a resource description framework database to generate the list of resources.

The resource provider may comprise a request parser configured to determine a resource request for at least one of the resources, and further configured to determine a resource identifier within the resource request, wherein the resource provider configured to access the persisted collection resource may be further configured to access the persisted collection resource based on the resource identifier.

The request parser may be configured to determine a resource request is configured to receive a resource request comprising a URI, the request parser configured to determine the URI as the resource identifier.

The resource request may further comprise an action. The resource provider may further comprise a request handler configured to process the resource request action based on the list of the resources.

The request handler may be further configured to perform an HTTP action with respect to the list of resources.

The resource provider may further comprise a response generator configured to output a message based on the processing of the resource request action.

The resource provider may further comprise at least one of: at least one memory configured to provide a resource structure wherein the persisted collection resource is co-located with the resources defined by the collection resource query with the at least one query parameter; and at least one memory configured to provide a first resource structure comprising the persisted collection resource and a second resource structure separate from the first resource structure comprising the resources defined by the collection resource query at least one query parameter.

A system may comprise a user apparatus configured to: generate and transmit to a resource provider a resource request for at least one of the resources; and a resource provider as featured herein, wherein the user apparatus is further configured to receive from the resource provider the message based on the processing of the resource request.

According to another aspect, there is provided a user apparatus for processing resources within a representational state transfer architecture, the user apparatus configured to: generate and transmit to a resource provider a resource request for at least one of the resources, the resource provider configured to receive the resource request, access a persisted collection resource comprising a collection query with at least one query parameter defining a collection of resources, process the collection resource query with respect to the resources within the computer system in order to generate a list of resources associated with the at least one query parameter, process the resource request based on the list of resources, and output a message based on the processing of the resource request; and receive from the resource provider the message based on the processing of the resource request.

The user apparatus may comprise a request generator configured to generate a GET action request with respect to a persisted collection resource identified by a defined URI, and wherein the user apparatus may further comprise a response handler configured to receive the list of members of the collection generated dynamically at the resource provider based on the collection resource query.

Aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of managing resources within a computer system implementing a representational state transfer architecture, the computer-implemented method comprising:
   accessing a persisted collection resource and at least one metadata resource identifying the persisted collection resource, the persisted collection resource comprising a collection query with at least one query parameter defining a collection of resources, wherein the at least one metadata resource comprises a Uniform Resource Identifier (URI), the URI identifying a location of the collection query with the at least one query parameter;
   processing the collection query with respect to resources within the computer system to dynamically generate a list of resources associated with the at least one query parameter, wherein dynamically generating the list is a result of processing the collection query;
   providing a resource structure comprising a first resource structure comprising the at least one metadata resource and the persisted collection resource and a second resource structure separate from the first resource structure comprising the collection of resources defined by the collection query with the at least one query parameter; and
   determining a resource request for at least one of the resources, the resource request comprising a resource identifier, wherein the accessing the persisted collection resource comprises accessing the persisted collection resource based on the resource identifier, wherein the resource request further comprises an action, and the method further comprises processing the action based on the list of resources, and wherein the processing the action based on the list of resources comprises performing a Hypertext Transfer Protocol (HTTP) action with respect to the list of resources.

2. The computer-implemented method of claim 1, wherein the at least one query parameter is a SPARQL 'WHERE' clause and a searchable variable, and wherein the processing the collection query comprises evaluating the at least one query parameter with respect to a resource description framework database to generate the list of resources.

3. The computer-implemented method of claim 1, further comprising outputting a message based on the processing the action.

4. The computer-implemented method of claim 1, further comprising:
   generating and transmitting to a resource provider a resource request for at least one of the resources; and
   receiving from the resource provider a message based on the processing of the resource request.

5. A system for managing resources within a system implementing a representational state transfer architecture, the system comprising:
   a memory; and
   a processor in communication with the memory, wherein the system is configured to perform a method, said method comprising:
      accessing a persisted collection resource and at least one metadata resource identifying the persisted collection resource, the persisted collection resource comprising a collection query with at least one query parameter defining a collection of resources, wherein the at least one metadata resource comprises a Uniform Resource Identifier (URI), the URI identifying a location of the collection query with the at least one query parameter;
      processing the collection query with respect to resources within the computer system to dynamically generate a list of resources associated with the at least one query parameter, wherein dynamically generating the list is a result of processing the collection query;
      providing a resource structure comprising a first resource structure comprising the at least one metadata resource and the persisted collection resource and a second resource structure separate from the first resource structure comprising the collection of resources defined by the collection query with the at least one query parameter; and
      determining a resource request for at least one of the resources, the resource request comprising a resource identifier, wherein the accessing the persisted collection resource comprises accessing the persisted collection resource based on the resource identifier, wherein the resource request further comprises an action, and the method further comprises processing the action based on the list of resources, and wherein the processing the action based on the list of resources comprises performing a Hypertext Transfer Protocol (HTTP) action with respect to the list of resources.

6. The system of claim 5, wherein the at least one query parameter is a SPARQL 'WHERE' clause and a searchable variable, and wherein the processing the collection query comprises evaluating the at least one query parameter with respect to a resource description framework database to generate the list of resources.

7. The system of claim 5, wherein the method further comprises:
   generating and transmitting to a resource provider a resource request for at least one of the resources; and
   receiving from the resource provider a message based on the processing of the resource request.

8. A computer program product for managing resources within a computer system implementing a representational state transfer architecture, the computer program product comprising:
   a computer readable storage medium readable by a processing circuit and storing instructions for execution by the processing circuit for performing a method comprising:
      accessing a persisted collection resource and at least one metadata resource identifying the persisted collection resource, the persisted collection resource comprising a collection query with at least one query parameter defining a collection of resources, wherein the at least one metadata resource comprises a Uniform Resource Identifier (URI), the URI identifying a location of the collection query with the at least one query parameter;
      processing the collection query with respect to resources within the computer system to dynamically generate a list of resources associated with the at least one query parameter, wherein dynamically generating the list is a result of processing the collection query;
      providing a resource structure comprising a first resource structure comprising the at least one metadata resource and the persisted collection resource and a second resource structure separate from the first resource structure comprising the collection of resources defined by the collection query with the at least one query parameter; and determining a resource request for at least one of the resources, the resource request comprising a resource identifier, wherein the accessing the persisted collection resource comprises accessing the persisted collection resource based on the resource identifier, wherein the resource request further comprises an action, and the method further comprises processing the action based on the list of resources, and wherein the processing the action based on the list of resources comprises performing a Hypertext Transfer Protocol (HTTP) action with respect to the list of resources.

9. The computer program product of claim 8, wherein the at least one query parameter is a SPARQL 'WHERE' clause and a searchable variable, and wherein the processing the collection query comprises evaluating the at least one query parameter with respect to a resource description framework database to generate the list of resources.

10. The computer program product of claim 8, wherein the method further comprises:
   generating and transmitting to a resource provider a resource request for at least one of the resources; and
   receiving from the resource provider a message based on the processing of the resource request.

* * * * *